United States Patent [19]

Wang et al.

[11] Patent Number: 5,209,990
[45] Date of Patent: May 11, 1993

[54] BATTERY ASSEMBLY

[76] Inventors: Juei-Liu Wang, No. 12, Lane 114, Nankung St.; Chao-Tung Cheng, No. 999, Chungcheng N. Rd., both of, Yungkang Hsiang, Tainan Hsien, Taiwan

[21] Appl. No.: 759,238

[22] Filed: Sep. 13, 1991

[51] Int. Cl.⁵ .......................................... H01M 2/38
[52] U.S. Cl. ....................................... 429/63; 429/80
[58] Field of Search .............................. 429/63, 73, 80

[56] References Cited

U.S. PATENT DOCUMENTS

| | | | |
|---|---|---|---|
| 3,485,678 | 12/1969 | Blaich et al. | 429/63 |
| 4,565,750 | 1/1986 | Isoi et al. | 429/80 X |
| 4,833,047 | 5/1989 | Isoi et al. | 429/80 X |

*Primary Examiner*—Stephen Kalafut
*Attorney, Agent, or Firm*—Knobbe, Martens, Olson & Bear

[57] ABSTRACT

A battery assembly has a battery case and a battery acid container, wherein the battery case has a number of sockets on an upper central part thereof and the battery acid container has a number of adjacent vessels. Each socket has a central post with crossed bridge linked therebetween to form apertures that surround the central post. Each vessel has a neck with a hat-like plug for inserting into the opening of the neck and an air vent between every two adjacent vessels. The hat-like plug has a weak portion which is easily torn apart upon insertion in the socket to fill battery acid therethrough and a reinforced portion for retaining the torn part affixed to the plug. A cover has a number of annular plugs to seal the sockets.

1 Claim, 6 Drawing Sheets

BATTERY ASSEMBLY

BACKGROUND OF THE INVENTION

The present invention relates to a battery assembly.

A conventional battery comprises a battery case having several openings for filling battery acid into the battery and an equal number of plugs for sealing the openings, as shown in FIG. 1. While filling battery acid, each plug must be removed to allow battery acid to be filled through each opening. However, it is not easy to fill battery acid precisely into the battery case, resulting in spillage; thus, there will be a waste of battery acid. In addition, battery acid is a strong acid, and a splash of battery acid is dangerous to the human body.

It is the purpose of this present invention, therefore, to mitigate and/or obviate the above-mentioned drawbacks in the manner set forth in the detailed description of the preferred embodiment.

SUMMARY OF THE INVENTION

It is an object of the present invention to provide a battery which is easy and safe to fill battery acid therein and which avoids leaking battery acid.

It is another object of the present invention to provide a battery acid container having an air vent between every two adjacent vessels for ventilating air.

These and additional objects, if not set forth specifically herein, will be readily apparent to those skilled in the art from the detailed description provided hereunder, with appropriate reference to the accompanying drawings.

DETAILED DESCRIPTION OF THE PREFERRED EMBODIMENTS

Figure 1:
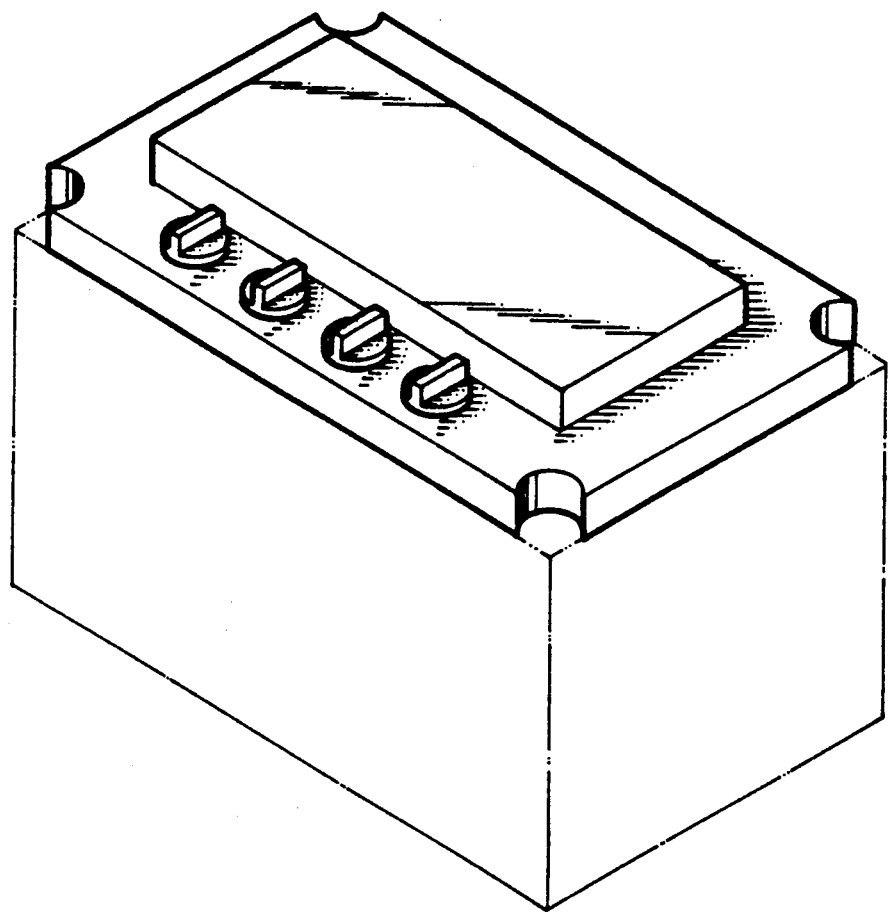
FIG. 1 is a perspective view of a conventional battery according to prior art.
Figure 2:
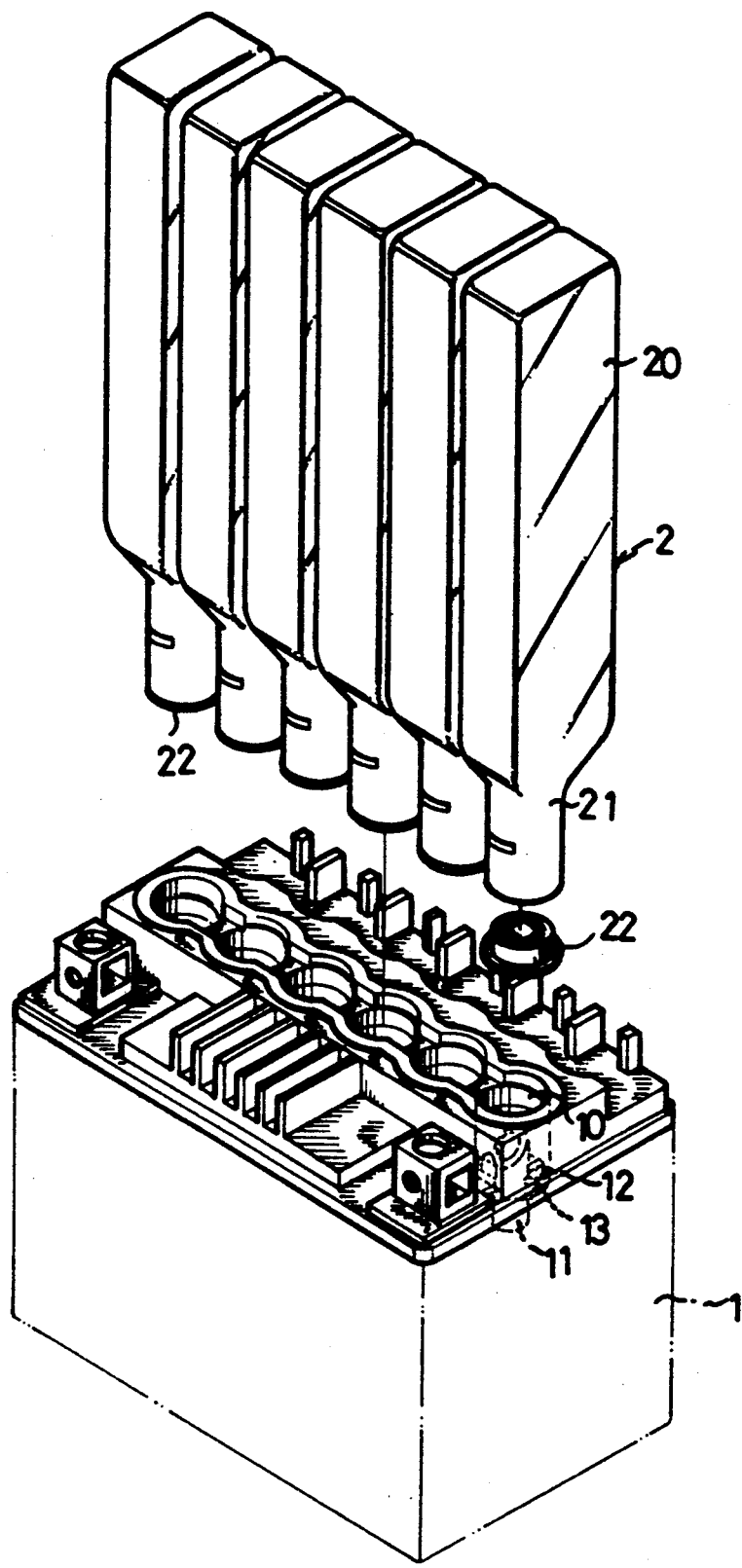
FIG. 2 is a perspective view of a battery case and a battery acid container in accordance with the present invention.
Figure 3:
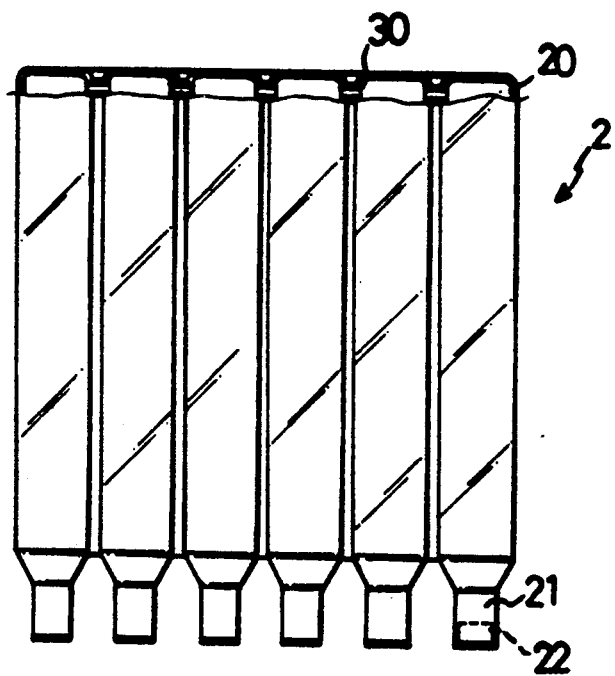
FIG. 3 is a plan view of a battery acid container in accordance with the present invention.
Figure 4:
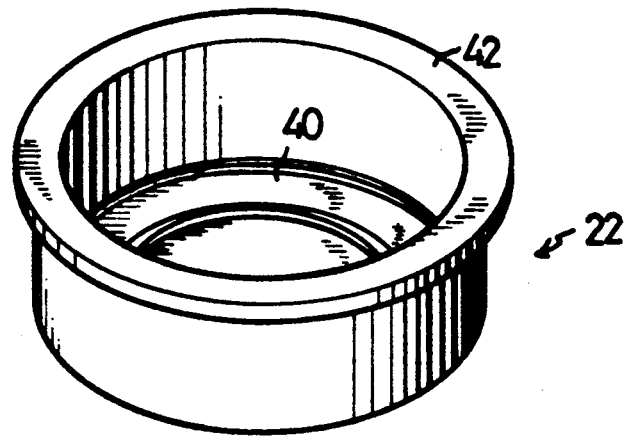
FIG. 4 is a perspective view of a plug used for blocking an opening of the battery acid container.
Figure 5:
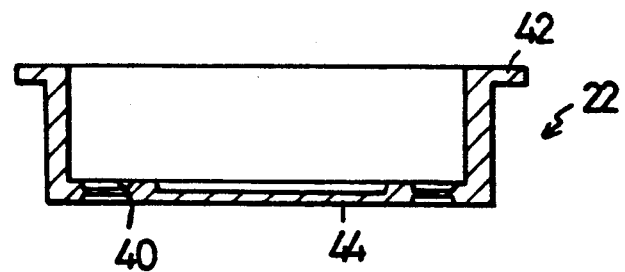
FIG. 5 is a cross-sectional view of the plug of FIG. 4.
Figure 6:
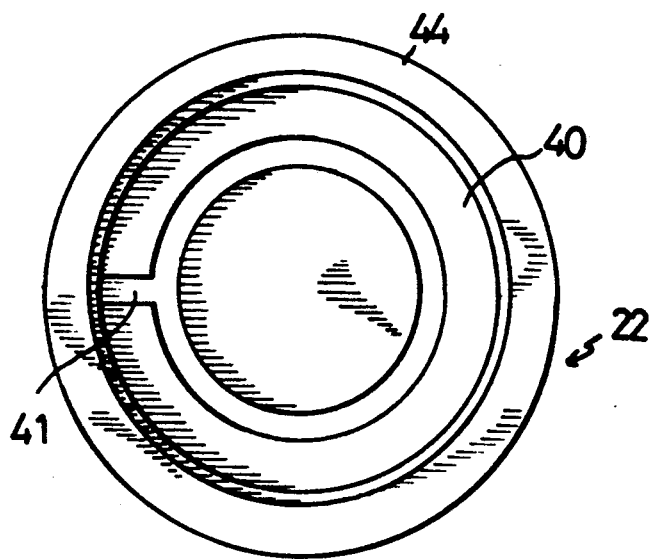
FIG. 6 is a top plan view of the plug of FIG. 4.
Figure 7:
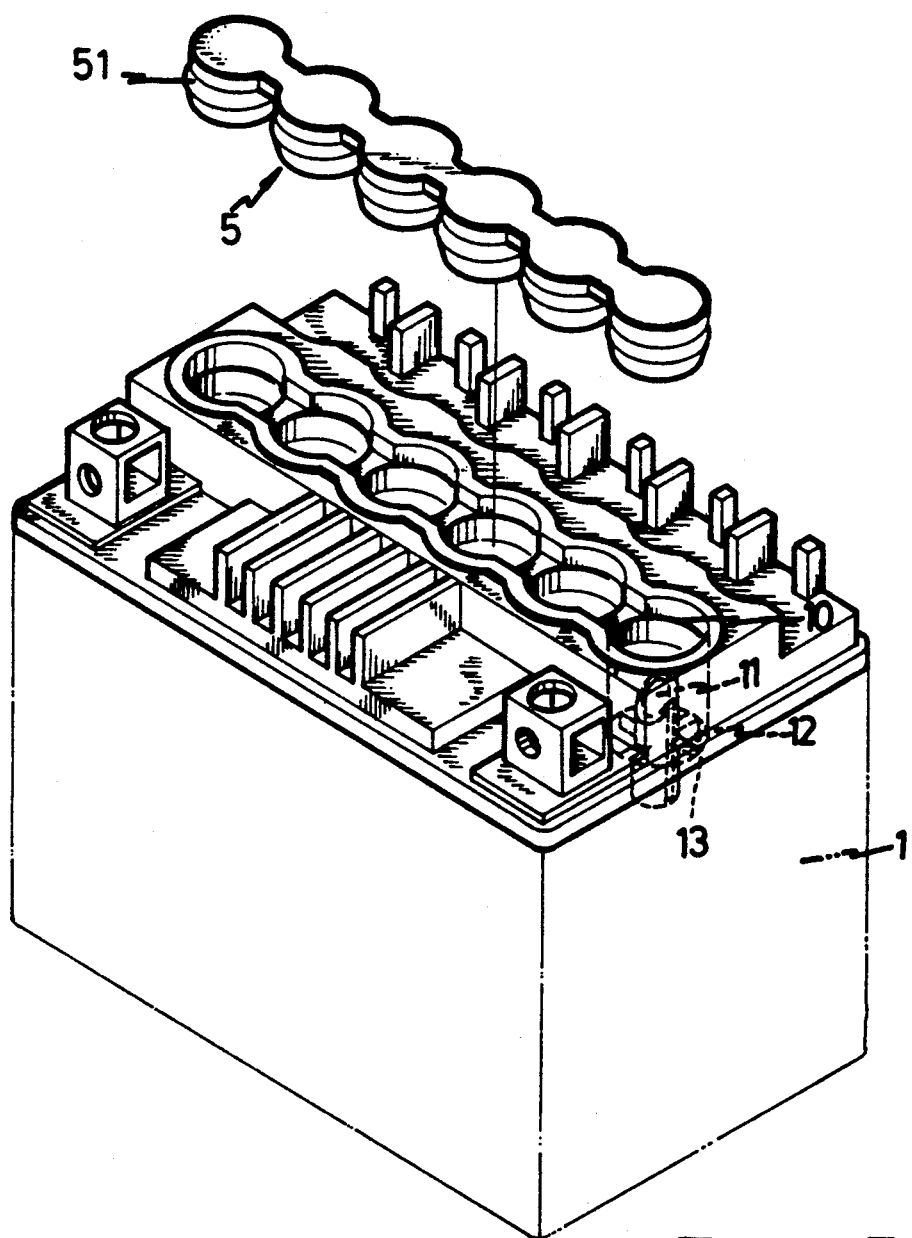
FIG. 7 is a perspective view of a battery case and a cover in accordance with the present invention.

Referring to FIGS. 2, 3, and 7, a battery assembly in accordance with the present invention comprises a battery case 1 and a battery acid container 2. The battery case 1 comprises a plurality or series of sockets 10 on an upper central part thereof, wherein each socket 10 has a central post 11 with a crossed bridge 13 linked therebetween to form apertures 12 that surround the central post 11. A cover 5 (only shown in FIG. 7) having a plurality or series of annular plugs 51 is further provided for sealing the sockets 10. The battery acid container 2 comprises a plurality or series of vessels 20 adjacent to each other, wherein between every two adjacent vessels 20 there is an air vent 30 with a diameter of about 1 mm to 2 mm for ventilating air. Each vessel 20 has a neck 21 adapted to receive a hat-like plug 22 inserted into its opening. As shown in FIGS. 4, 5, and 6, a plug 22 comprises a flange 42 surrounding an opening thereof and a bottom 44 including a weak portion 40 to be torn apart from the body thereof by the central post 11 and a reinforced portion 41 to prevent the weak portion 40 from dropping into the vessel 20.

The battery case 1 can be easily filled with battery acid by inserting the battery acid container 2 into the sockets 10. The plug 22 of the battery acid container 2 will be pierced by the central post 11 to that battery acid can be filled homogeneously into the battery case 1 through the sockets 10. After finishing the filling of battery acid, the battery case 1 can be sealed with the cover 5 by inserting the latter into the sockets 10.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A battery assembly comprising a battery case for accommodating battery acid via a plurality of sockets thereof, a cover means for sealing said sockets, and a battery acid container for filling battery acid into said case through said sockets, said battery assembly is characterized in that:

said battery acid container comprising a plurality of vessels adjacent to each other and an air vent formed between a respective pair of said adjacent vessels for ventilating air between said vessels, each said vessel having a mouth and a plug mounted on said mouth, said plug comprising a flange surrounding an opening thereof and a bottom including a weak portion able to be torn apart upon insertion into said battery case and a reinforced portion for retaining said weak portion affixed to said plug.

* * * * *